United States Patent [19]

Tang

[11] Patent Number: 5,682,963
[45] Date of Patent: Nov. 4, 1997

[54] BRAKE ASSEMBLY FOR A BICYCLE

[76] Inventor: Jen-hui Tang, No. 23, Lane 2, Kuochi St., 9th Lin, Hsintung Village, Lungching Hsiang, Taichung Hsien, Taiwan

[21] Appl. No.: 679,008

[22] Filed: Jul. 12, 1996

[51] Int. Cl.$^6$ .................................................... B62L 3/00
[52] U.S. Cl. ................... 188/24.22; 74/489; 74/502.2; 188/2 D; 188/24.11
[58] Field of Search ...................... 188/24.22, 2 D, 188/24.11, 24.12, 24.13, 24.14, 24.16, 24.19, 24.21; 74/489, 502.2, 506, 504, 505, 517, 475

[56] References Cited

U.S. PATENT DOCUMENTS

| | | | |
|---|---|---|---|
| 4,653,613 | 3/1987 | Blancas | 188/24.22 |
| 4,895,224 | 1/1990 | Sugihara et al. | 188/24.22 |
| 4,901,595 | 2/1990 | Ozaki et al. | 74/489 |
| 5,134,897 | 8/1992 | Romano | 74/502.2 |
| 5,370,017 | 12/1994 | Krauer | 74/502.2 |
| 5,437,206 | 8/1995 | Boor | 74/489 |
| 5,476,019 | 12/1995 | Cheever et al. | 74/502.2 |
| 5,524,501 | 6/1996 | Patterson et al. | 74/489 |
| 5,590,564 | 1/1997 | Kishimoto | 74/502.2 |

*Primary Examiner*—Douglas C. Butler
*Attorney, Agent, or Firm*—Bacon & Thomas

[57] ABSTRACT

A brake assembly for a bicycle includes a stationary portion fixedly mounted to a handlebar of the bicycle, the stationary portion having a first tube for a rotatable portion rotatably mounted thereto, a spring disposed between the rotatable portion and the stationary portion to pull the rotatable portion back to an original position thereof after the rotatable portion is rotated, a protrusion extending from one side of the rotatable portion, a brake cable having one end thereof extending through a second tube which extends from the stationary portion and towards a direction opposite to that of the first tube, and connected to the protrusion such that when the rotatable portion is rotated, the cable is pulled.

6 Claims, 8 Drawing Sheets

BRAKE ASSEMBLY FOR A BICYCLE

BACKGROUND OF THE INVENTION

1. Field of the Invention

The present invention relates to a brake assembly and more particularly, to a brake assembly disposed coaxially to a handlebar of a bicycle and the brake assembly is operated by rotating a rotatable portion thereof.

2. Brief Description of the Prior Art

Generally, a bicycle has a brake assembly which is actuated to stop the bicycle. The brake assembly includes a front wheel brake portion and a rear wheel portion, each of the two wheel brake portions being controlled by a respective brake lever disposed to each end of the handlebar. The brake levers are each connected to respective brake cables which are in turn connected to a respective brake mechanism of each of the front wheel and the rear wheel. Such brake levers extend laterally from the handlebar to a certain width whereby a rider of the bicycle should pull the levers toward the handlebar to pull the brake cables to actuate the corresponding brake mechanism. However, some riders who have small hands will experience difficulties in grasping the levers. Furthermore, because the levers protrude from the handlebar, if the bicycle falls, the levers could be broken.

The present invention intends to provide a brake assembly which is disposed coaxially to the handlebar and is operated by rotating a rotatable portion of the assembly so as to mitigate and/or obviate the above-mentioned problems.

SUMMARY OF THE INVENTION

The present invention provides a brake assembly for a bicycle and includes a stationary portion having a first side and a second side, the first side having a first tube extending perpendicularly from a bottom thereof and the first tube communicating with a first hole defined in the bottom so as to receive a handlebar there in. A skirt portion extends from the bottom and is in parallel with the first tube. A second tube extends from the second side of the stationary portion and has a passage defined longitudinally therein, the passage communicating with a second hole defined in the bottom.

A rotatable portion has a first side and a second side, the first side having a third tube extending perpendicularly from a bottom thereof and the third tube communicating with a third hole defined in the rotatable portion for rotatably mounted to the first tube. A protrusion extends perpendicularly from the second end of the bottom and extends around a periphery of the third hole, the protrusion having a head portion extending radially therefrom. A spring is disposed between the head portion and an end plate transversely disposed in the stationary portion.

A brake cable extends through the second tube and second hole and has one end thereof fixedly connected to the head portion such that when rotating the rotatable portion is rotated to compress the spring, the brake cable is pulled.

It is an object of the present invention to provide a brake assembly which is coaxially disposed to a handlebar.

It is another object of the present invention to provide a brake assembly which is operated by rotating a rotatable portion thereof.

It is a further object of the present invention to provide a brake assembly which is operated without releasing any fingers from the handlebar.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
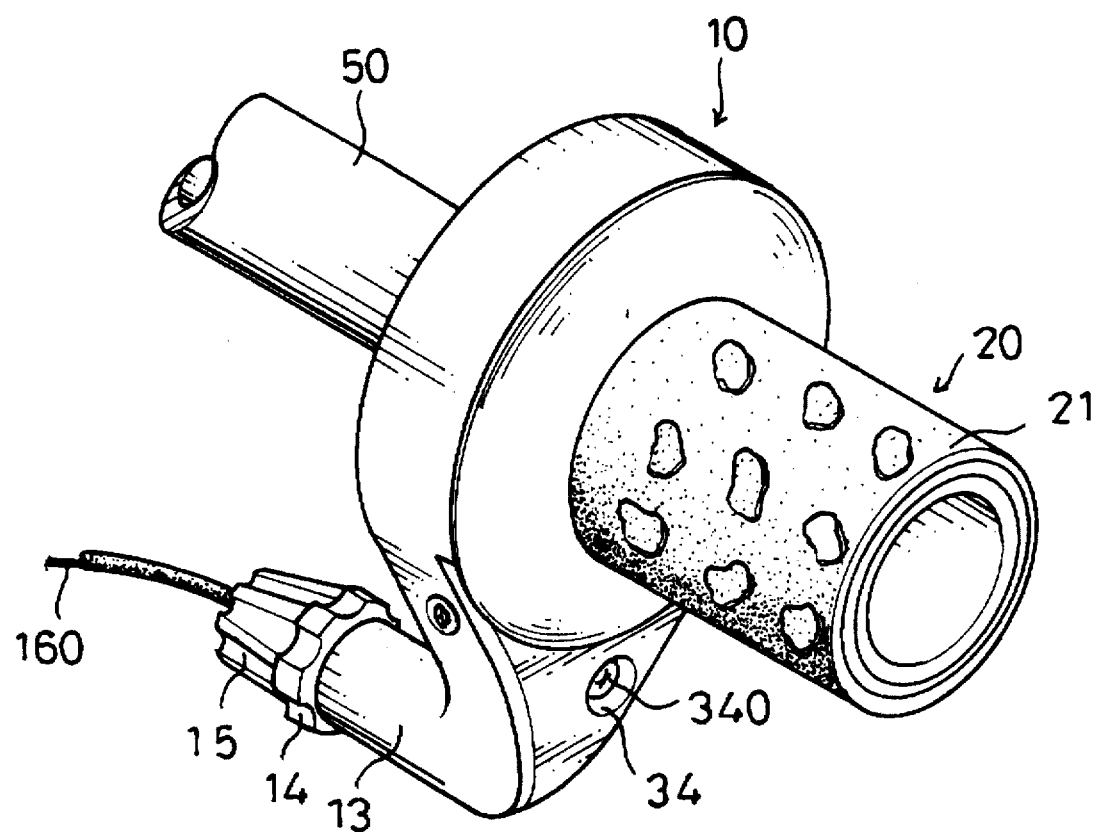
FIG. 1 is a perspective view of a brake assembly in accordance with the present invention.
Figure 2:
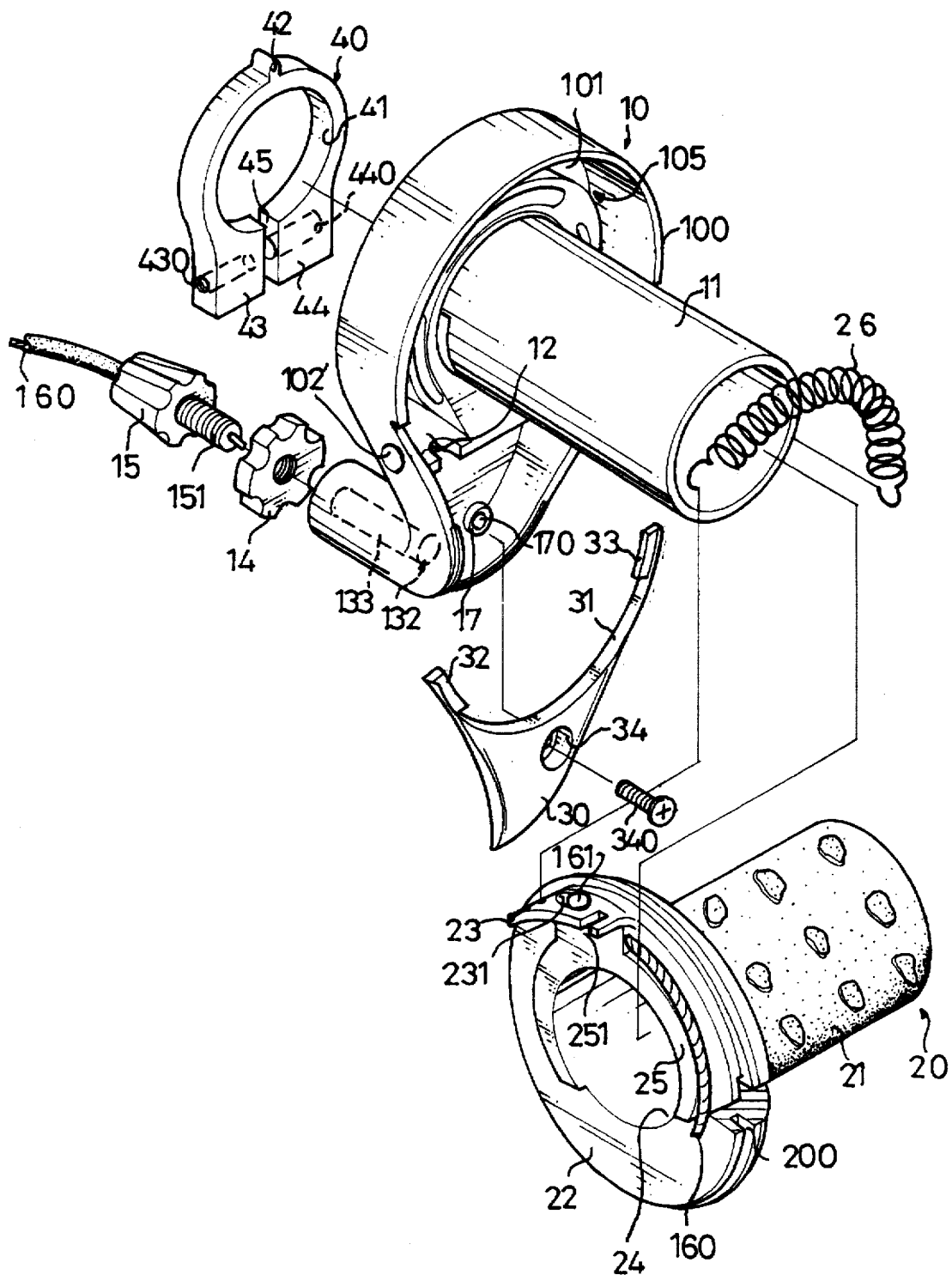
FIG. 2 is an exploded view of the brake assembly in accordance with the present invention.
Figure 3:
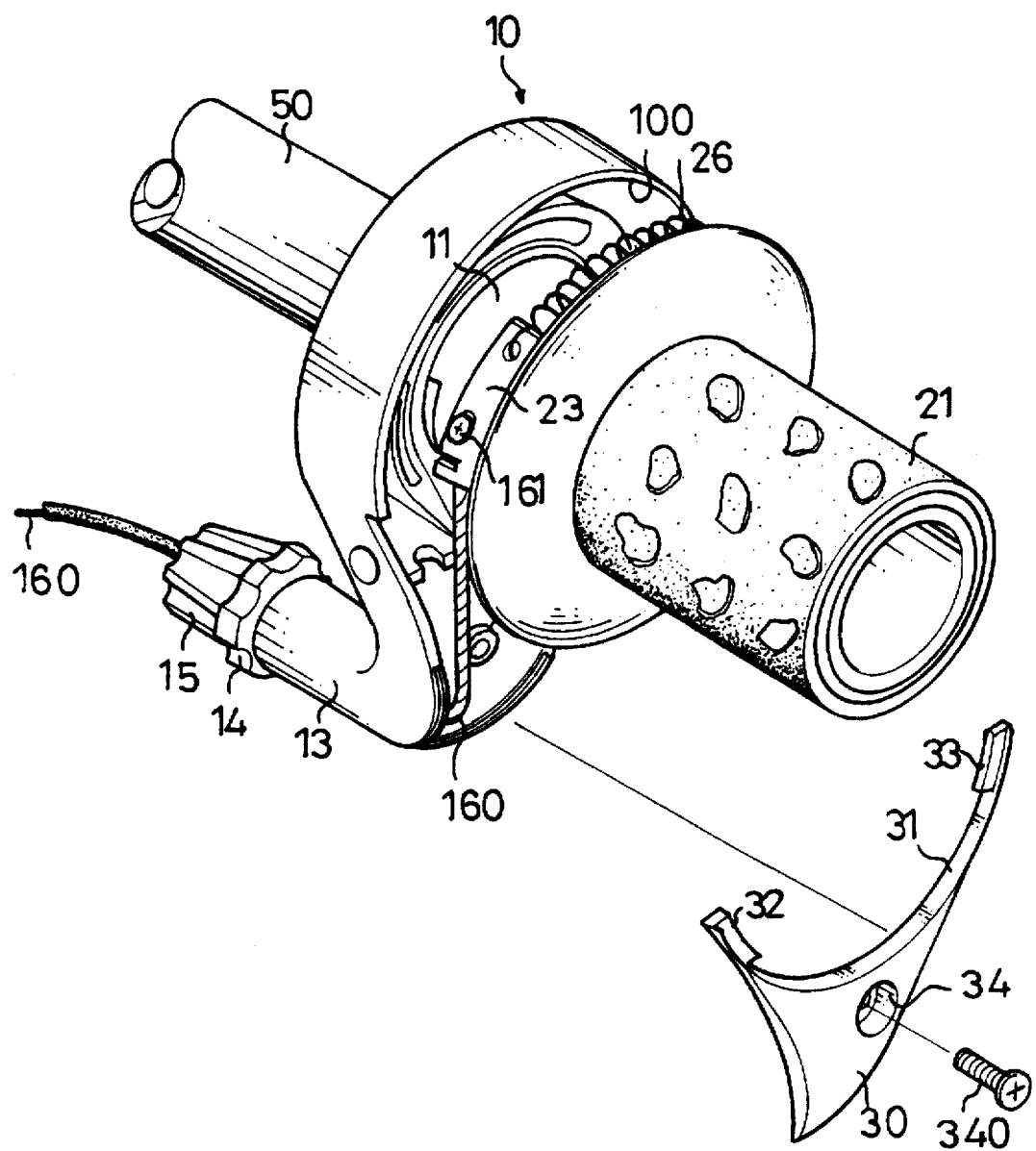
FIG. 3 is an exploded view of the brake assembly in accordance with the present invention to show an arrangement of the brake cable in the brake assembly.

Referring to the drawings and initially to FIGS. 1 through 3, a brake assembly in accordance with the present invention generally includes a stationary portion 10, a rotatable portion 20 wherein a handlebar 50 is coaxially received in the stationary portion 10 and the rotatable portion 20. The stationary portion 10 has a disk portion with a first side and a second side, the first side having a first tube 11 extending perpendicularly from a bottom 101 thereof and the first tube 11 communicating with a first hole 110 (see FIG. 6) defined in the bottom 101 so as to receive the handlebar 50 in the first tube 11. A skirt portion 100 extends from the bottom 101 and is in parallel with the first tube 11. An end plate 12 is transversely disposed below the first tube 11 and both of two ends of the end plate 12 are connected to an inner periphery of the skirt portion 100 so as to define a recess 105 between the skirt portion 100, the first tube 11, the bottom 101 of the stationary portion 10 and the end plate 12. A second tube 13 extends from the second side of the stationary portion 10 and has a passage 133 defined longitudinally therein, the passage 133 communicating with a second hole 132 defined in the bottom 101. The passage 133 of the second tube 13 has an inner threaded periphery defined therein.

The rotatable portion 20 has a disk portion with a first side and a second side, an annular groove 200 defined in a periphery thereof, the first side having a third tube 21 extending perpendicularly from a bottom 22 thereof and the third tube 21 communicating with a third hole 24 defined in the rotatable portion 20. A protrusion 25 extends perpendicularly from the second side of the bottom 22 and extends around a periphery of the third hole 24, the protrusion 25 having a head portion 251 extending radially therefrom. The head portion 251 of the protrusion 25 has an L-shaped passage defined therein so as to fixedly received an end of a brake cable 160. The brake cable 160 has one end thereof connected to a brake mechanism (not shown) corresponding thereto and the other end thereof extends through a block 15 and a threaded rod 151 which extends from the block 15. The threaded rod 151 threadedly engages with the inner threaded periphery of the passage 133 of the second tube 13. The brake cable 160 then extends through the second hole 132 and connects to the head portion 251 the brake cable 160 extending along an outer periphery of the protrusion 25. A lock nut 14 is disposed between the block 15 and the second tube 13 so as to securely position the block 15. A stop 23 extends perpendicularly from the head portion 251 and a slot 231 is defined in the stop 23 such that a head 161 of the end of the brake cable 160 can be fixedly engaged with a periphery of the slot 231 via the L-shaped passage of the head portion 251. The third tube 21 is rotatably mounted to the first tube 11 and a spring 26 is disposed between the end plate 12 and the head portion 251.

Figure 6:
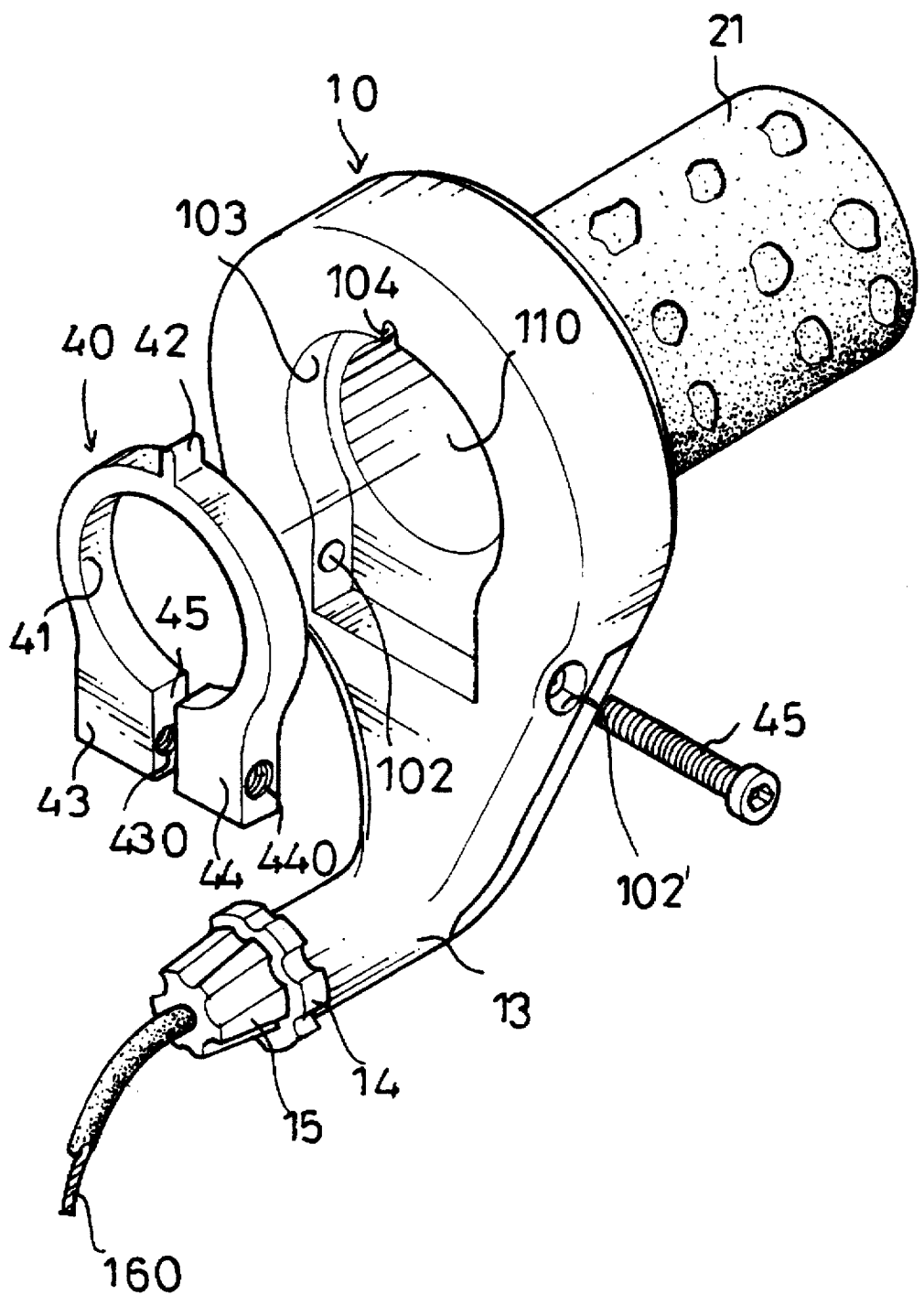
FIG. 6 is an exploded view of the brake assembly to show a clip member to be received in a stationary portion of the brake assembly.
Figure 7:
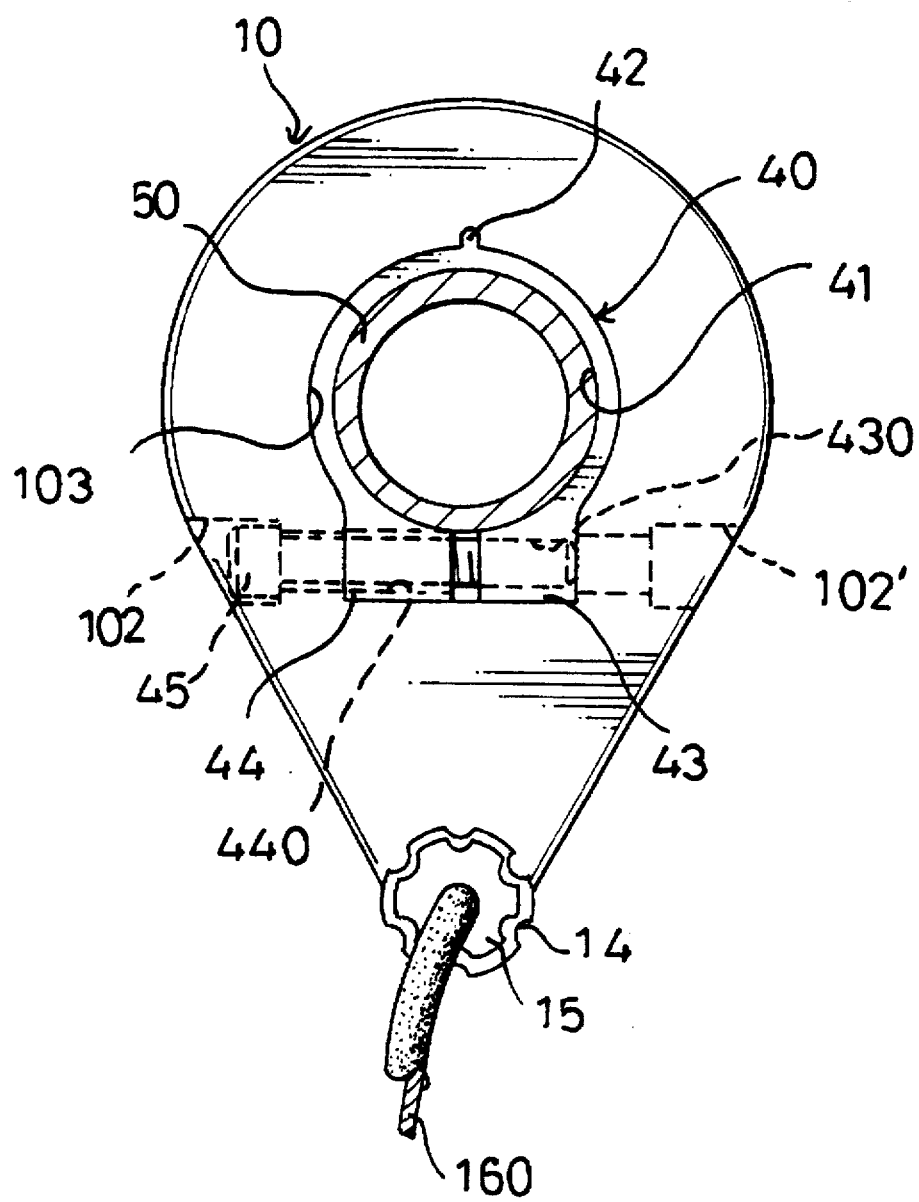
FIG. 7 is an end elevational view, partly in section, of the brake assembly when disposed to right end of the handlebar.
Figure 8:
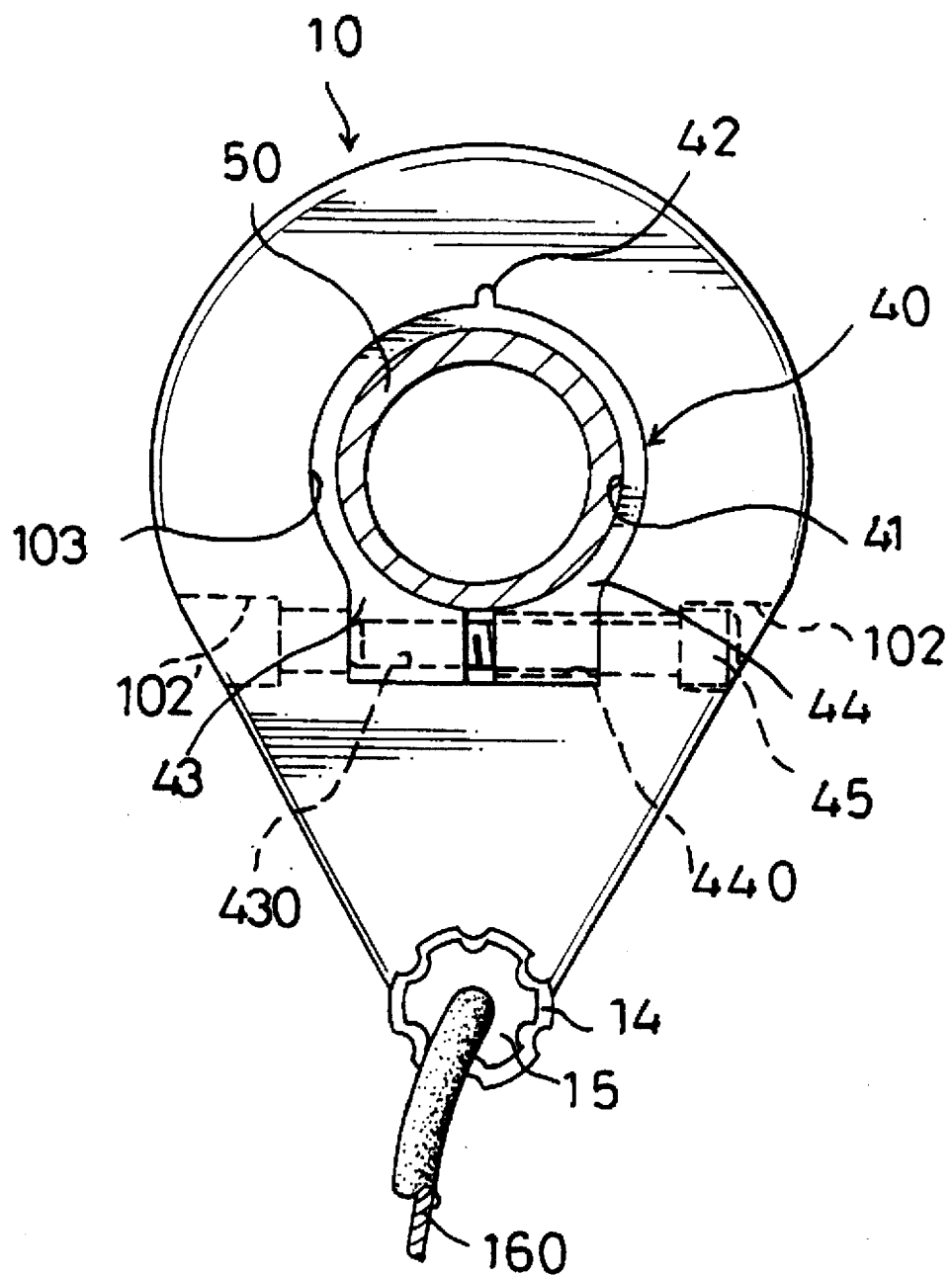
FIG. 8 is an end elevational view, partly in section, of the brake assembly when disposed to left end of the handlebar.

Referring to FIG. 6, the stationary portion 10 has a recess portion 103 defined in the second side thereof. A right hole 102 and a left hole 102' are respectively defined laterally in the stationary portion 10 and communicate with the recess portion 103. A clip member 40 has a central hole 41 defined therein and a slit 45 is defined in a lower portion thereof so as to form two parts 43, 44 separated by the slit 45. Each of the two parts 43, 44 has a threaded hole 440/430 defined laterally therein and communicating with the slit 45 such that when the clip member 40 is received in the recess portion 103, the central hole 41 communicates and is in alignment with the first hole 110 of the stationary portion 10. The clip member 40 has a ridge 42 extending outwardly therefrom and a corresponding notch 104 is defined in an inner periphery of the recess portion 103 so as to receive the ridge 42 therein when the clip member 40 is received in the recess portion 103. The handlebar 50 extends through the clip member 40 and is received in the first tube 11. A bolt 45 extends through the right hole/left hole 102/102' and is threadedly received in the threaded holes 440, 430 of the two parts 43, 44 of the clip member 40 to securely position the handlebar 50. FIGS. 7 and 8 show the position of the bolt 45 when the assembly is disposed to the right end and the left end of the handlebar 50.

A cover 30 has a recessed top 31 and two lugs 32, 33 extending from each of two ends of the recessed top 31 such that each of the two lugs 32, 33 can be received in the annular groove 200. A screw 340 extends through a hole 34 defined in the cover 30 and is threadedly received in with a threaded hole 170 defined in a boss 17 which extends from the bottom 101 of the stationary portion 10.

Figure 4:
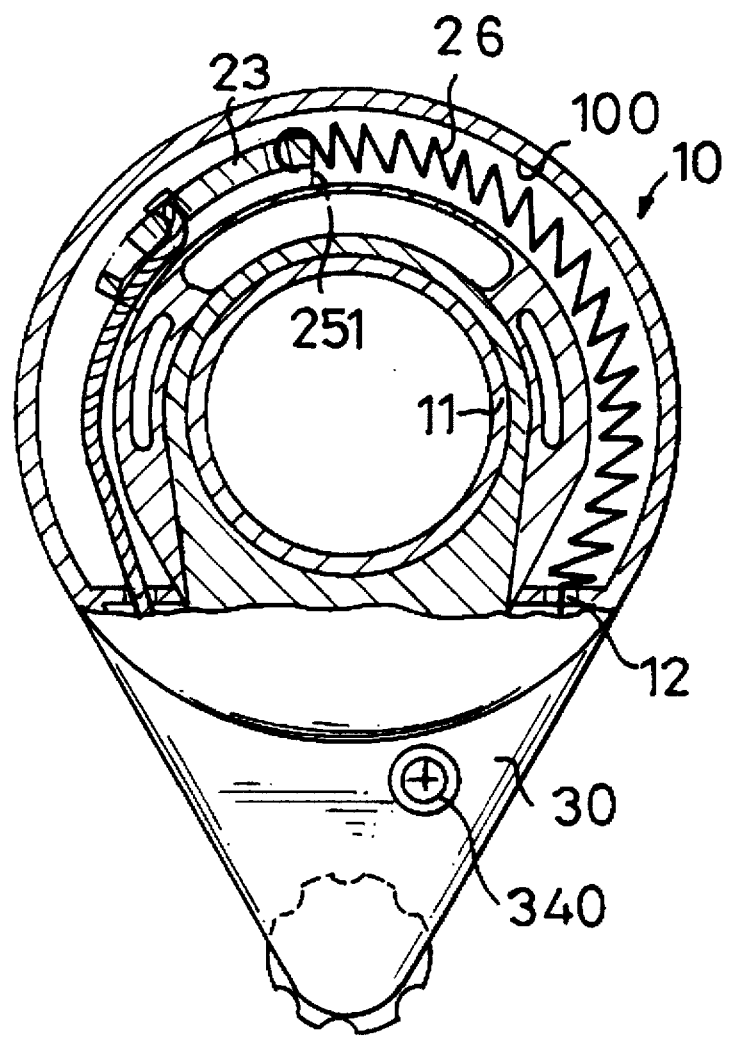
FIG. 4 is an end elevational view, partly in section, of the brake assembly wherein a rotatable portion is not yet rotated.
Figure 5:
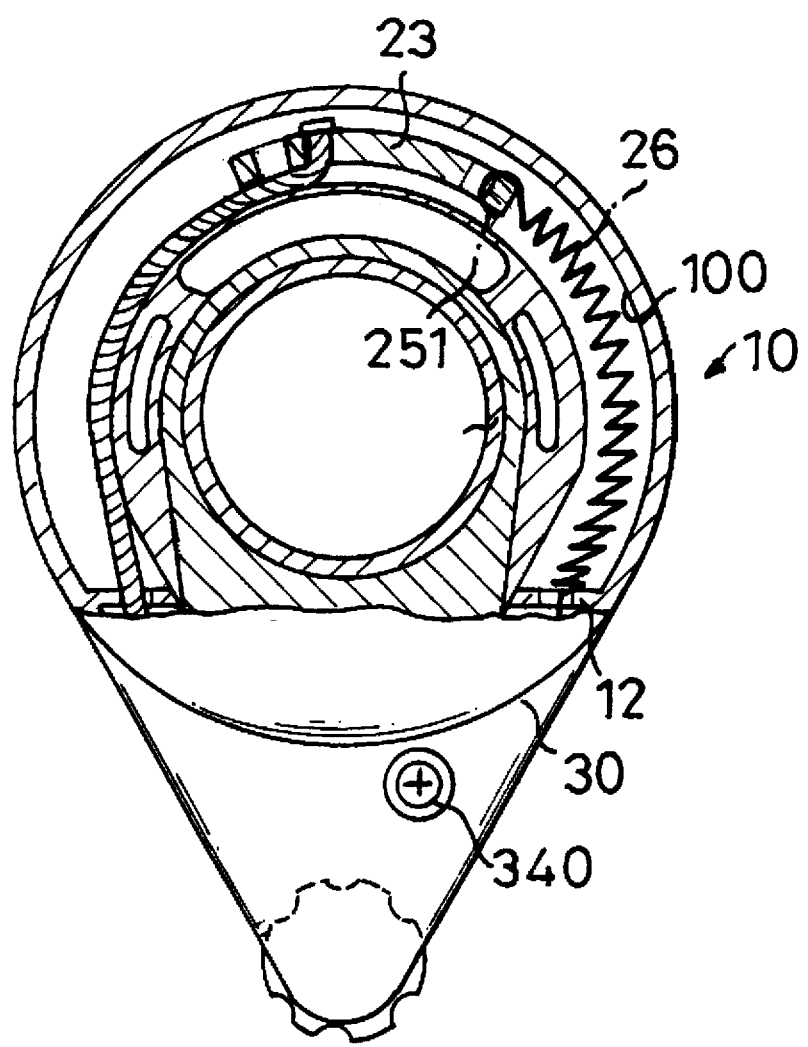
FIG. 5 is an end elevational view, partly in section, of the brake assembly wherein the rotatable portion is rotated.

Referring to FIGS. 4 and 5, when operating the brake assembly, a rider (not shown) simply rotates the rotatable portion 20 to compress the spring 26 and therefore the brake cable 160 is pulled to actuate the brake mechanism, and when the rotatable portion 20 is released, the biasing force of the spring 26 will let the rotatable portion 20 return to an original position thereof. The stop 23 is designed to prevent the rotatable portion 20 from being over-rotated by being in contact with the end plate 12.

Accordingly, the rider needs not open his/her hand to operate the brake assembly, therefore, the brake assembly in accordance with the present invention provides a safety feature for the rider to brake without effecting a balance of the riding.

Although the invention has been explained in relation to its preferred embodiment, it is to be understood that many other possible modifications and variations can be made without departing from the spirit and scope of the invention as hereinafter claimed.

What is claimed is:

1. A brake assembly for a bicycle and comprising:

a stationary portion having a first side and a second side, said first side having a first tube extending perpendicularly from a bottom thereof and said first tube communicating with a first hole defined in said bottom so as to receive a handlebar in said first tube, a skirt portion extending from said bottom and being in parallel with said first tube, an end plate transversely disposed below said first tube and both of two ends of said end plate connected to an inner periphery of said skirt portion so as to define a recess between said skirt portion, said first tube, said bottom of said stationary portion and said end plate, a second tube extending from said second side of said stationary portion and having a passage defined longitudinally therein, said passage communicating with a second hole defined in said bottom;

a rotatable portion having a first side and a second side, said first side having a third tube extending perpendicularly from a bottom thereof and said third tube communicating with a third hole defined in said rotatable portion, a protrusion extending perpendicularly from said second side of said bottom and extending around a periphery of said third hole, said protrusion having a head portion extending radially therefrom, said third tube rotatably mounted to said first tube and a spring disposed between said end plate and said head portion, and a brake cable extending through said second tube and said second hole and having one end thereof fixedly connected to said head portion such that when rotating, said rotatable portion is rotated to compress said spring, said brake cable is pulled.

2. The brake assembly as claimed in claim 1 wherein said stationary portion has a recess portion defined in said second side thereof, a right hole and a left hole respectively defined laterally in said stationary portion and each communicating with said recess portion, a clip member having a central hole defined therein and a slit defined in a lower portion thereof so as to form two parts separated by said slit, each of said two parts having a threaded hole defined laterally therein and each of which communicates with said slit such that said clip member is received in said recess portion and said central hole communicating and in alignment with said first hole of said stationary portion, a bolt extending through said right hole/left hole and threadedly received in said threaded holes of said two parts of said clip member to securely position said handlebar extending through said central hole.

3. The brake assembly as claimed in claim 2 wherein said clip member has a ridge extending outwardly therefrom and a notch is defined in an inner periphery of said recess portion so as to receive said ridge therein when said clip member is received in said recess portion.

4. The brake assembly as claimed in claim 1 wherein said head portion of said protrusion has a L-shaped passage defined therein so as to fixedly receive said end of said brake cable.

5. The brake assembly as claimed in claim 1 wherein said passage of said second tube has an inner threaded periphery defined therein.

6. The brake assembly as claimed in claim 1 wherein a stop extends from said head portion so as to contact said end plate to prevent the rotatable portion being over-rotated.

* * * * *